Figure 1:
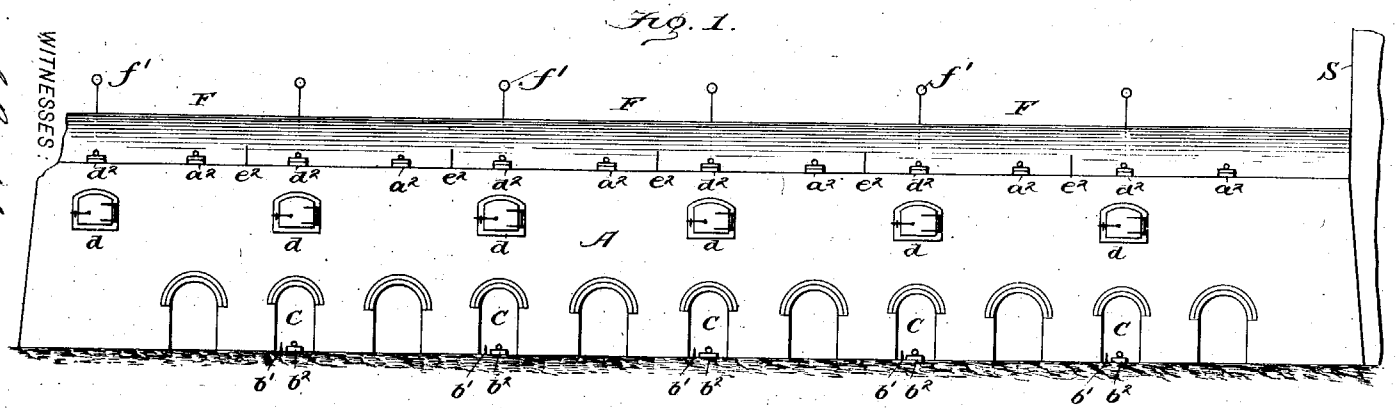

4 Sheets—Sheet 1.

C. & A. KLOSE.

BRICK KILN.

No. 11,635. Reissued Nov. 2, 1897.

WITNESSES:

Edwin L. Bradford

Geo. M. Copenhaver.

INVENTORS

Charles Klose

Alois Klose

BY

J. Walter Fowler

ATTORNEY.

C. & A. KLOSE.

BRICK KILN.

No. 11,635. Reissued Nov. 2, 1897.

WITNESSES:

Edwin L. Bradford

Geo. M. Copenhaver,

INVENTORS

Charles Klose

Alois Klose

BY

T. Walter Fowler,

ATTORNEY.

4 Sheets—Sheet 3.

C. & A. KLOSE.

BRICK KILN.

No. 11,635. Reissued Nov. 2, 1897.

WITNESSES:

Edwin L. Bradford

Geo. M. Copenhaver,

INVENTORS

Charles Klose

Alois Klose

BY

P. Walter Fowler

ATTORNEY.

4 Sheets—Sheet 4.

C. & A. KLOSE.

BRICK KILN.

No. 11,635.

Reissued Nov. 2, 1897.

WITNESSES

Edwin L. Bradford

Geo. M. Copenhaver

INVENTORS

Charles Klose

Alois Klose

BY

T. Walter Fowler

ATTORNEY.

UNITED STATES PATENT OFFICE.

CHARLES KLOSE, OF DONIPHAN, NEBRASKA, AND ALOIS KLOSE, OF ROBESONIA, PENNSYLVANIA.

BRICK-KILN.

SPECIFICATION forming part of Reissued Letters Patent No. 11,635, dated November 2, 1897.

Original No. 576,318, dated February 2, 1897. Application for reissue filed September 7, 1897. Serial No. 650,851.

*To all whom it may concern:*

Be it known that we, CHARLES KLOSE, a citizen of the United States, residing at Doniphan, in the county of Hall and State of Nebraska, and ALOIS KLOSE, a citizen of the German Empire, residing at Robesonia, in the county of Berks and State of Pennsylvania, have invented certain new and useful Improvements in Brick-Kilns, of which the following is a specification.

This invention has reference to certain improvements in brick-kilns of that class which are based on the principle of a continuous downdraft and in which a continuous working is obtained by the successive charging, drying, burning, cooling, and renewing of the bricks in a number of adjacent chambers, so that the burning of the bricks is accelerated and a considerable saving of time, fuel, and labor obtained.

Our invention consists of a brick-kiln which comprises a series of chambers separated by register-vaults, said chambers being charged from one end in the usual manner and provided with arched crowns having transverse openings and with floors having rows of apertures communicating with longitudinal bottom flues extending below the different chambers. Above the register-vaults and in line with the crown-openings of the arched chambers are arranged transverse chambers having fire-brick combustion-floors, said transverse chambers being charged with fuel, as required by the progress of the brick-burning operation. These transverse combustion-chambers are connected with each other by longitudinal caloriducts which communicate with the crown-openings and are provided with charging-openings in their crowns, which openings are closed by caps fitting over said openings. The transverse combustion-chambers are closed at one end by doors for giving access to said channels, while the opposite ends are connected by means of crown-openings with the main smoke-flue that extends over said combustion-chambers, the openings in the smoke-flue being opened or closed by means of dampers the rods of which pass through the crown of the smoke-flue and are operated from the outside of the same. Vertically above the centers of the openings in the crown-openings of the individual chambers peep-holes and lids for covering them are arranged in top of the kilns, so as to observe the progress of the burning operation. Registers are arranged in the longitudinal bottom flues of the kiln, which registers are operated from the transverse register-vaults, in which are arranged fuel-openings provided with thimbles and covers for dropping the fuel into the bottom flues for bottom-firing. Dampers are arranged in the longitudinal caloriducts near each register-vault and transverse combustion-chamber for regulating thereby the draft through the different chambers of the kiln, as required for drying, burning, and cooling of the bricks.

Figure 2:
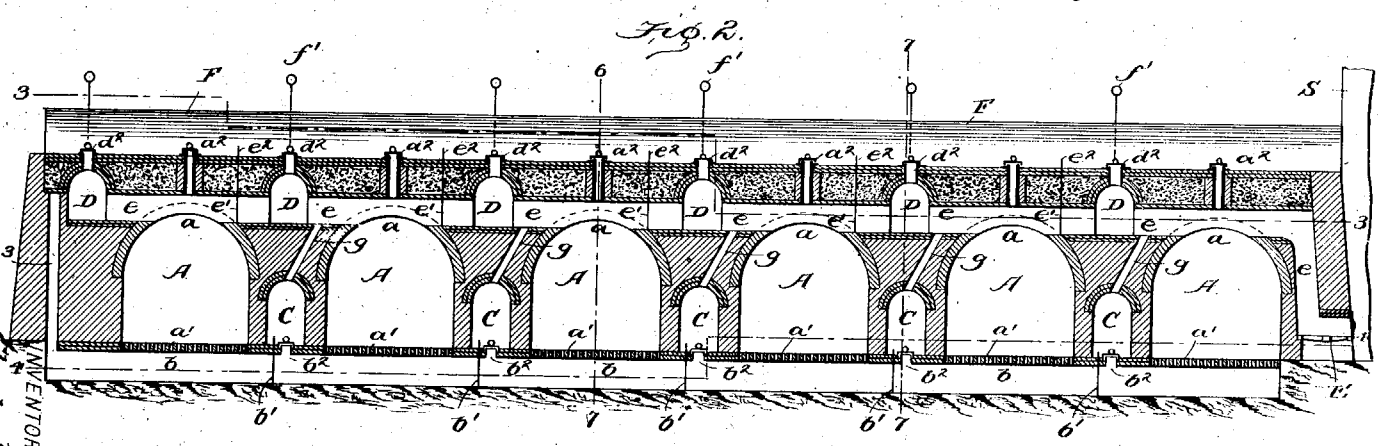
Figure 3:
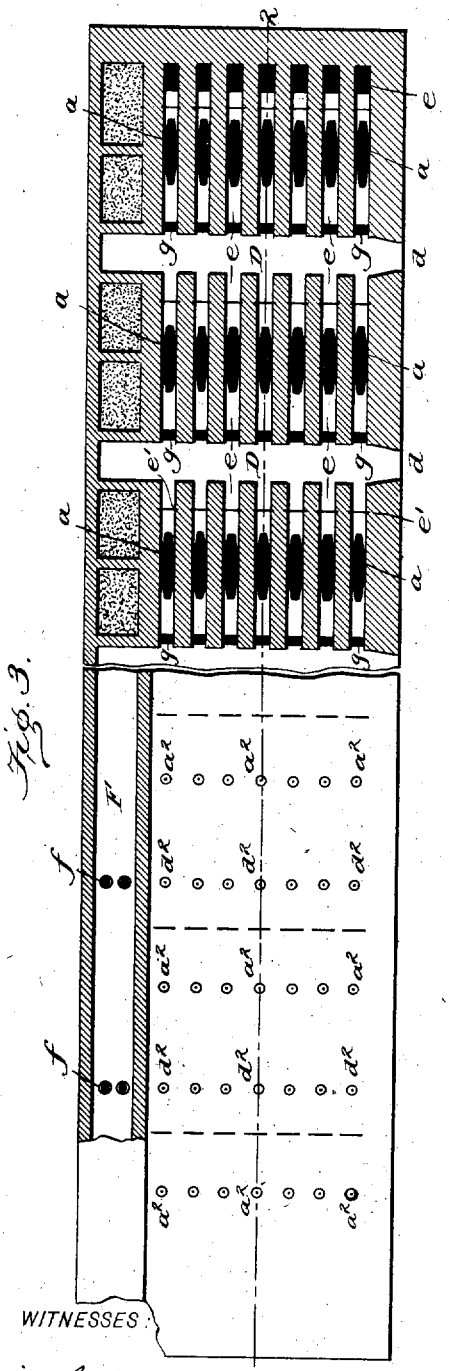
Figure 4:
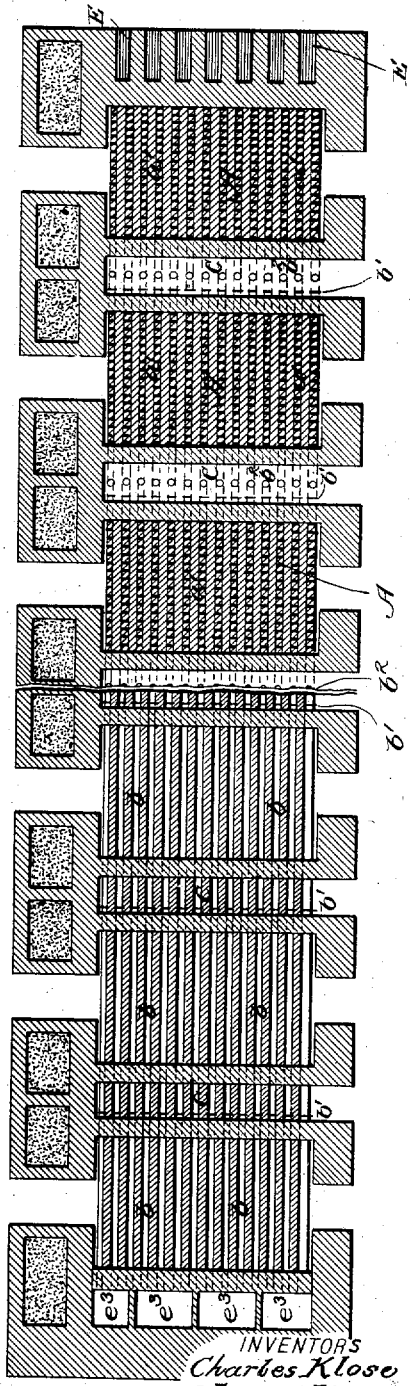
Figure 5:
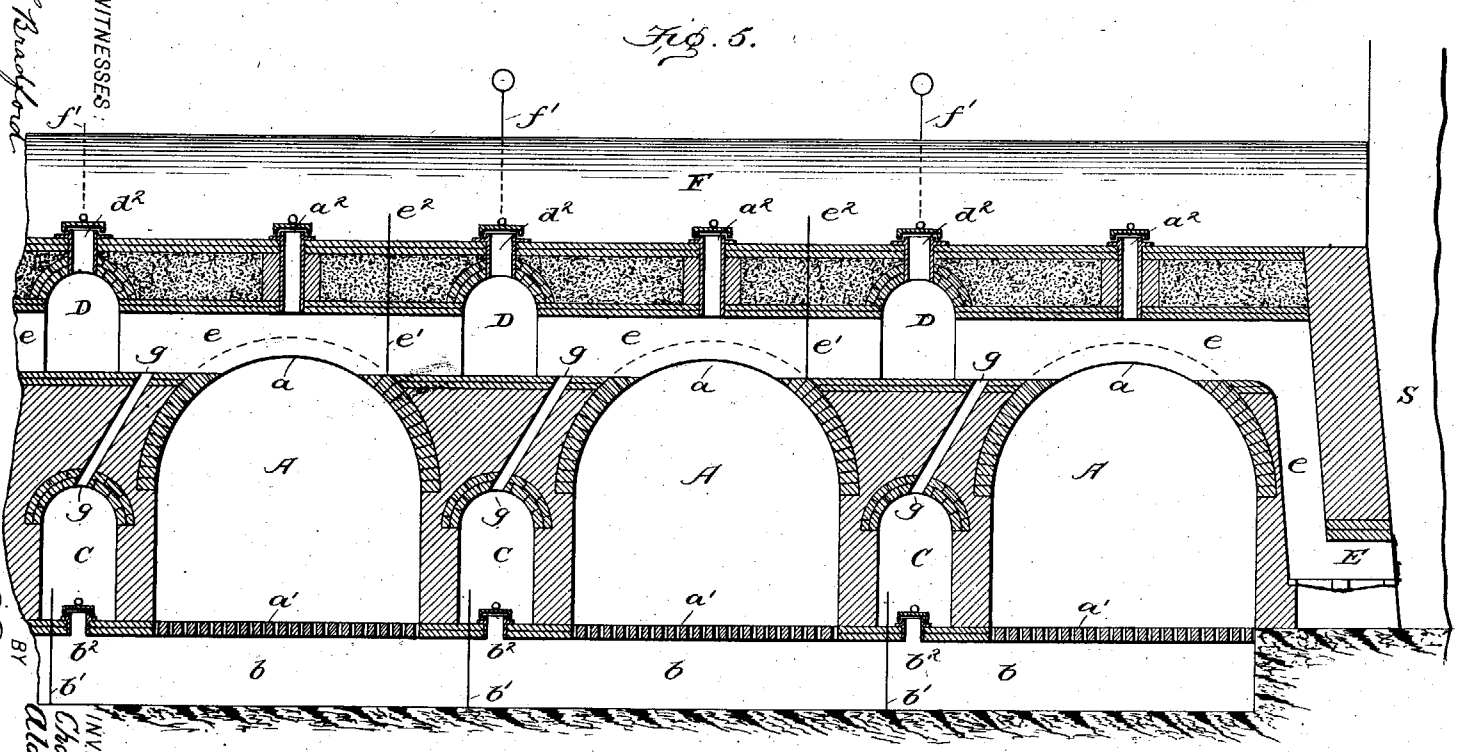
Figure 6:
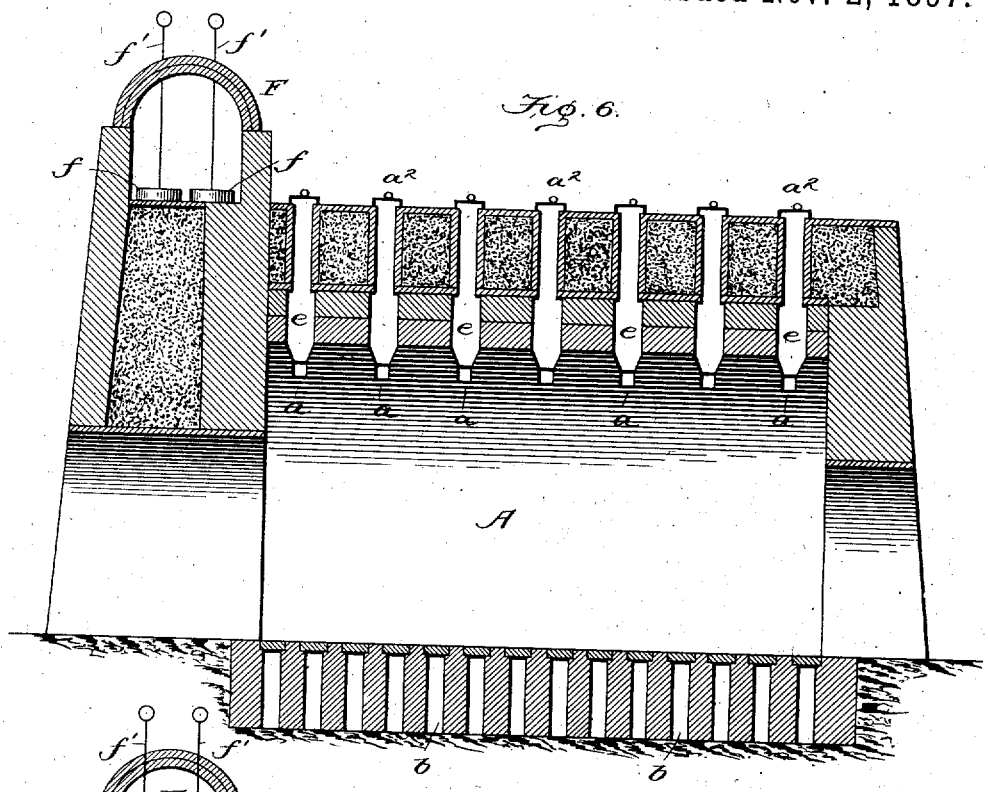
Figure 7:
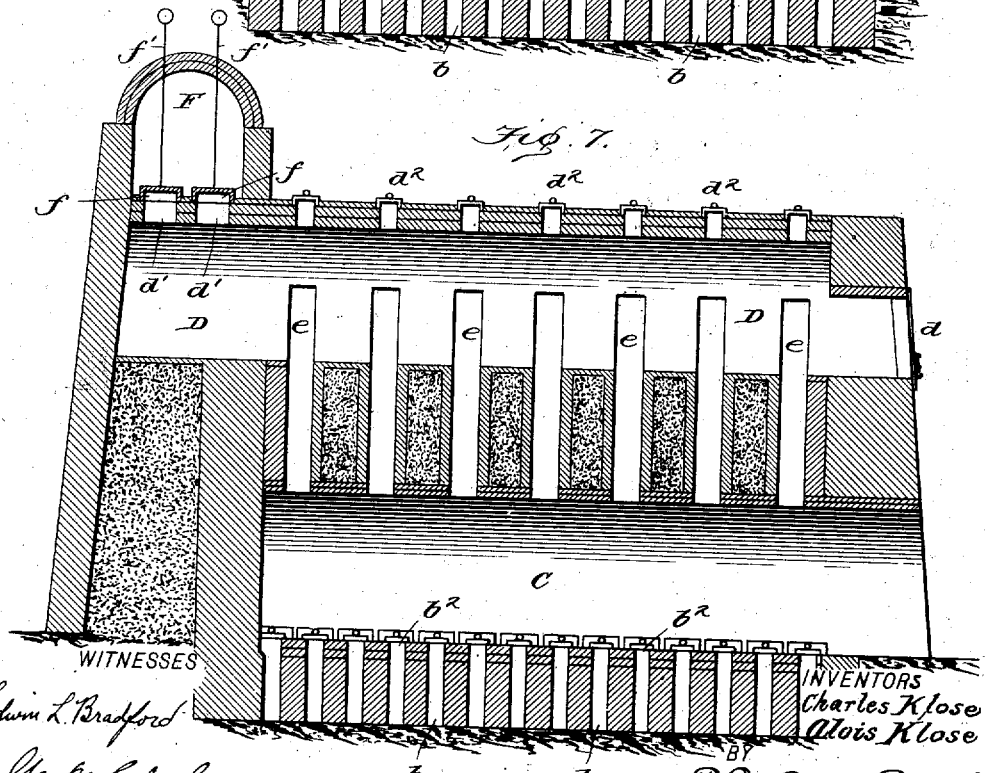

In the accompanying drawings, Figure 1 represents a side elevation of the kiln with six chambers. Fig. 2 is a vertical longitudinal section of the same on line 2 2, Fig. 3. Fig. 3 is a plan view, partially in horizontal section, on line 3 3, Fig. 2. Fig. 4 is also a horizontal section through the lower part of the kiln taken on line 4 4, Fig. 2. Fig. 5 is a vertical longitudinal section of a portion of the kiln, taken on the same line as Fig. 2, but drawn on a larger scale; and Figs. 6 and 7 are vertical transverse sections drawn on a larger scale and taken on lines 6 6 and 7 7, Fig. 2.

Similar letters of reference indicate corresponding parts.

Our improved brick-kiln with continuous downdraft can be arranged with any number of chambers, it being preferably made in the general shape of an oblong in one or two rows, so that a continuous firing can be carried on in regular succession through the different chambers of the kiln. In the drawings a series of six chambers are shown, but it is obvious that this number may be increased or decreased at will, according to the required capacity of the plant.

The different chambers A of the kiln are provided with arched crowns and floors having rows of openings $a'$, which communicate with bottom flues $b$ $b$ below the floors, said flues extending longitudinally throughout the entire length of the kiln. The arched crowns of the individual chambers A are provided with transverse openings $a$, which are arranged in line with parallel longitudinal caloriducts $e$, communicating with the same. The side walls of the chambers are provided with charging-openings, which, however, when two rows of chambers are arranged in battery alongside of each other are also used as discharge-openings, but when only a single series or battery of chambers is arranged then the burned bricks are preferably discharged at the opposite side of the kiln, as shown in plan view in Fig. 4.

Above the crown-opening $a$ of each chamber A is arranged in the top of the kiln a peep-hole $a^2$, which is provided with the usual thimble and lid, so that the progress of the burning operation can be readily observed in the different chambers of the kiln. Between the chambers A are arranged partition-walls of a sufficient strength for imparting the required stability to the entire kiln without the use of tie-rods, said partition-walls being provided with transverse arched register-vaults C, which are open at one end and closed at the opposite end. They serve for the purpose of giving access to the rods of the registers $b'$, which are arranged in the bottom flues $b$, and by which the draft from one chamber to the other is controlled. In the floor of the register-vaults C are further arranged fuel-openings $b^2$, provided with thimbles and lids, so as to permit the charging of fuel into the longitudinal bottom flues $b$ in case bottom firing should be necessary during the burning operation, according to the kind and quality of the bricks to be produced. The main advantage of the bottom fires is that they increase the hardness of the bricks in the lower courses. The bottom flues $b$ can be readily cleaned of the ashes in the same by taking out some of the floor-bricks of the chamber A and removing the ashes by raking or shoveling, after which the floor-bricks are replaced.

Vertically above the register-vaults C are arranged arched transverse combustion-chambers D, which are provided at one end with hinged doors $d$ and connected at the opposite ends with openings $d'$ in the crown of the flues, which openings communicate with an arched smoke-flue F, which extends longitudinally along one side of the kiln above the ends of the transverse chambers D and communicates with the smoke-stack S, which is arranged at one end of the kiln. The draft-openings $d'$ are closed by dampers or bell-valves $f$, which are raised or lowered by damper-rods $f'$, that extend through the crown of the main smoke-flue F and are provided with handles at their upper ends. The transverse combustion-chambers D are connected with the crown-openings $a$ of the chambers A by longitudinal caloriducts $e$, which are separated from each other by intermediate walls, as shown clearly on the right-hand side of Fig. 3.

The essential object of the transverse combustion-chambers is to utilize them successively as firing-chambers in the successive burning of the bricks in the various chambers A. Therefore they are successively charged with fuel through openings $d^2$, provided with thimbles and lids, said fuel-openings being located in the crown of the arched chambers and said chambers communicating with the openings in the crown of the main chambers A, whereby the heated gases drawn from an adjacent chamber in which the last charge of bricks has been burned are directed into the transverse combustion-chamber to facilitate the combustion therein and are reheated in said transverse combustion-chamber and, together with the products of combustion from said transverse chamber, are drawn through the crown-opening of the next succeeding chamber A in a downward direction and through the openings in the floor thereof into the longitudinal bottom flues $b$ $b$, the separating-register $b'$ being opened, so that the hot gases can pass in an upward direction through the floor-openings of another succeeding chamber A and, through the crown-openings thereof, into the upper longitudinal calordiducts $e$, then through a combustion-chamber D, which in this instance serves as a draft-flue to convey the products of combustion to the flue F and finally to the smoke-stack. The fuel is thus charged into a transverse combustion-chamber interposed in the caloriduct between the crown-openings of two adjacent chambers A and is burned on the fire-brick floor of the transverse combustion-chamber, and the highly-heated gases from the chamber A immediately preceding this transverse combustion-chamber, and which contains the last charge of bricks burned and is now "dead" and cooling, instantly ignite the fuel and are in turn reheated previous to their being discharged downwardly through the next succeeding chamber A, while the fresh air necessary to complete combustion is drawn in through the ash-pits of the fireplaces E, located at the end of the kiln.

In addition to their primary object of serving as combustion-chambers the transverse chambers D are successively utilized as draft-flues, but when so used their office as combustion-chambers ceases. In other words, when fuel is charged into one of these transverse chambers D and is ignited by the highly-heated gases from the chamber A just preceding it and in which the last charge of brick has been burned the damper of a similar chamber D, say the second one beyond or succeeding the combustion-chamber to be fired, is opened and the products of combustion from said combustion-chamber now being fired after passing downwardly through the next succeeding main chamber and upwardly through the main chamber which next succeeds the last-mentioned one passes into the said transverse chamber D, which is now for the time being a draft passage or flue, and finally passes to the stack. Thus each of the transverse chambers D has a twofold purpose, namely: first and primarily, as a chamber for top firing, and, secondly, as a draft-passage for a preceding and corresponding chamber that is being used as a firing-chamber for its own succeeding main chamber A.

From the floor of each of the combustion-chambers D extend inclined ash-chutes $g$ into the register-vaults C, so that the ashes can be readily dropped into an ash-barrel in the latter for removal. The lower end of the ash-chutes $g$ can be readily closed by means of paper or pasteboard, which is held in position by the suction exerted on the same. In each caloriduct $e$ is located at one side of the transverse chambers D a register $e'$, the rods $e^2$ of which are passed through the top of the kiln, said registers being raised or lowered as required by the draft to be produced during the successive firing of the bricks in the different chambers.

At the end of the kiln are arranged as many fireplaces E as there are caloriducts $e$, which fireplaces serve for the purpose of firing the charge in the first chamber A. When the charge in the first chamber A is burned, the firing is interrupted in the fireplaces and all the firing of the charges in the remaining chambers is accomplished in the combustion-chambers D by the fuel dropped into the same through the fuel-openings of the same. By the fires in these chambers D the continuous downdraft which was first supplied for the first chamber from the fireplaces E is kept up in succession through one chamber after the other, while the supply of air necessary for combustion is supplied to the fireplaces and drawn through the caloriducts over the top of the chambers to the chamber in which the firing is in progress. The air while being drawn through the caloriducts is heated by contact with the hot walls of said ducts and produces thereby the complete combustion of the fuel. The heat emitted from the chambers over which the air passes in its course to the fires also assists in heating the air. At the opposite end of the kiln vertical channels $e^3$ connect the longitudinal bottom flues $b$ $b$ with a transverse chamber D, which is connected in the same manner with the main smoke-flue as the other chambers D. When a second row or battery of chambers is arranged alongside of the first row, then the end chambers of the first row are connected directly with the adjacent end chambers of the second row, so that the firing can be continued along said row until the last chamber of the second row can be connected with the first chamber of the first row, so that thereby the continuous firing of the kiln can be kept up.

Our improved brick-kiln is operated as follows: Before the fire is started in the fireplaces at the end of the kiln the first and second chambers of the same are charged with green bricks. The charging-openings in the side wall or walls are then closed in the usual manner. The fires are then started in the fireplaces E at the end of the kiln and the charge of bricks in the first chamber is subjected to the action of the fires, the first set of registers $e'$ in the caloriducts $e$ being closed and the first set of registers $b'$ in the bottom flues opened. The heat is drawn through the charge and then conducted through the floor-openings and bottom channels to the second chamber, and then in upward direction through the charge in the second chamber, and then through the crown-opening of this chamber and the next transverse combustion-chamber D into the smoke-stack, the next set of registers $e'$ being likewise closed and the corresponding valves or dampers $f$ in the smoke-flue opened, so as to produce the proper course of the draft. The charge in the second chamber A is heated by the surplus heat from the first chamber. In addition thereto some of the other chambers can be charged with green bricks and the heated products of combustion drawn successively through the same, so as to produce in the third chamber the warming of the bricks and in the fourth chamber the so-called "drying" or "water-smoking" of the same." When the bricks in the first chamber are burned, the charge in the second chamber is at red heat, the burning being then completed by the fires started in the first combustion-chamber D, the hot products of combustion being drawn from said fires in a downdraft through the charge in the second chamber, while the supply of air necessary for combustion is drawn in through the fireplaces at the end of the kiln. The products of combustion from the top fires after having been passed through the charge are then drawn through the floor-openings and bottom flue into the next chamber in upward direction through the same, then in downward direction again to the third chamber, and so on, so that the heat of the fires is fully utilized. The products of combustion are finally drawn off through one of the transverse chambers D and the smoke-flue to the chimney. During the burning of the charge in the second chamber the heat given off by the burned charge in the first chamber is drawn off and utilized in heating up the air drawn in through the fireplaces E and the charges in the successive chambers, so that all the heat from a charge of burned bricks in one chamber is utilized. The burned bricks in the first chamber are permitted to remain in the same until they have cooled off, when they are removed from the same. One chamber after the other is thus fired in succession by the top firing in the successive transverse combustion-chambers, so that the final firing of the charge of bricks is always produced by a continuous downdraft. In a similar manner the fires are started in the bottom channels, so that thereby the uniform burning of the bricks in the lower courses of the next adjacent chamber is obtained. By the action of the top fires on the charge of bricks in one chamber and the action of the bottom fires on the lower courses of the charge in the next following chamber the uniform burning of all the courses of bricks in each chamber can be produced, while by the action of the top firing alone the lower courses, and especially the bricks in the lower courses of the chamber, would not be as uniformly burned as the bricks in the upper courses. The bottom firing consequently forms an important auxiliary to the top firing, as it gives thereby full control over the entire charge of bricks in each chamber and produces a uniform product.

The essential feature of our improved brick-kiln consists in the arrangement of the transverse combustion-chambers D, so that top firing with downdraft through the individual chambers A can be successfully carried out. The top firing supplemented by the bottom firing for the next adjacent chambers and the utilization of the heat of the products of combustion in the various chambers of the kiln furnish a number of advantages, namely:

First. A uniform quality of bricks is obtained by the successive top and bottom firing applied to one chamber after the other until fully utilized in effective work.

Second. By the continuous working of the kiln from chamber to chamber no interruption in the burning takes place, so that a large quantity of bricks can be made by a plant, the charging with green bricks taking place in one chamber, the drying in the second, the firing in the third, the cooling in the fourth, the removing of the cooled-off bricks from the fifth chamber, and so on, so that nearly all of the chambers are in operation.

Third. Owing to the almost complete utilization of the heat of the fuel and the heating up of the air required for combustion in its way to the fires a considerable saving in fuel is obtained, while owing to the location of the fires above and below the chambers comparatively less fuel is required for burning the bricks, as the heat of the fuel and of the burned bricks is utilized in kiln drying and burning the bricks in the adjacent chambers.

Having thus described our invention, what we claim as new, and desire to secure by Letters Patent, is—

1. A brick-kiln comprising a series of main kiln-chambers each having an opening in its crown, longitudinal caloriducts above said chambers and communicating with the crown-openings thereof, a transverse combustion-chamber between each pair of main kiln-chambers and to be successively fired, each of said combustion-chambers receiving the highly-heated gases of a preceding main kiln-chamber and having means which enables each combustion-chamber to connect with the smoke-flue whereby it serves as a draft-passage for a corresponding preceding combustion-chamber in which fuel is being burned.

2. A brick-kiln comprising a series of main kiln-chambers having top openings, a fire-place or combustion-chamber for the initial chamber, a caloriduct extending longitudinally above the said kiln-chambers and receiving the heated gases therefrom, and a series of supplemental transverse combustion-chambers communicating with the caloriduct and adapted to be successively fired whereby the highly-heated gases of a main chamber in which the last charge of bricks has been burned, enter the adjacent combustion-chamber and are reheated therein previous to their downward passage through a succeeding main chamber, each of said transverse combustion-chambers having a damper-controlled opening whereby it serves as a draft-passage for a corresponding preceding combustion-chamber in which fuel is being burned.

3. The combination of a series of arched chambers, each chamber being provided with crown-openings and floor-openings, longitudinal bottom flues connecting the floor-openings of the different chambers, longitudinal caloriducts extending above the crowns of said chambers and communicating therewith through said crown-openings, register-vaults between said chambers provided with fuel-openings at the bottom for use in bottom firing, said openings establishing communication with the longitudinal bottom flues, transverse firing-chambers located above the register-vaults, a main smoke-flue extending along the rear ends of the transverse firing-chambers, and dampers connecting said transverse firing-chambers with the main smoke-flue, substantially as set forth.

4. The combination of a series of chambers, provided with crown-openings and rows of floor-openings, register-vaults located between said chambers, and provided with fuel-openings and registers alongside of said fuel-openings, longitudinal caloriducts extending above the crowns of said chambers, registers in said caloriducts, transverse firing-chambers located above the register-vaults and provided with fuel-openings, and ash-chutes extending from the caloriducts into the register-vaults, substantially as set forth.

5. The combination of a series of chambers, having crown-openings and rows of floor-openings, longitudinal bottom flues connecting the floors of the chambers, register-vaults between said chambers, longitudinal caloriducts extending above the crowns of the chambers, transverse firing-chambers located above said register-vaults, the bottom flues and the transverse firing-chambers being provided with fuel-openings for permitting the starting of top and bottom fires, substantially as set forth.

6. The combination of a series of kiln-chambers, having crown-openings and rows of floor-openings, fireplaces arranged at one end of the kiln series, longitudinal caloriducts connected with said fireplaces and extending over the crowns of said chambers, registers in said caloriducts, a series of successive transverse firing-chambers arranged intermediately between the crowns of the chambers and provided with top fuel-openings, the register-vaults having fuel-openings in the floors, longitudinal bottom flues below the floors of the chambers, registers in said bottom flues, a smoke-flue extending along one end of the transverse firing-chambers, and dampers for opening or closing the openings connecting the firing-chambers with the smoke-flue, substantially as set forth.

In testimony that we claim the foregoing as our invention we have signed our names in presence of two subscribing witnesses.

CHARLES KLOSE.
ALOIS KLOSE.

Witnesses:
U. S. LITZENBERG,
WM. F. SCHLECHTER.